US008016067B2

(12) United States Patent
Horgas

(10) Patent No.: US 8,016,067 B2
(45) Date of Patent: Sep. 13, 2011

(54) VIBRATION ISOLATION ASSEMBLY

(76) Inventor: Jon Horgas, South Lyon, MI (US)

( * ) Notice: Subject to any disclaimer, the term of this patent is extended or adjusted under 35 U.S.C. 154(b) by 94 days.

(21) Appl. No.: 12/389,518

(22) Filed: Feb. 20, 2009

(65) Prior Publication Data

US 2009/0211829 A1   Aug. 27, 2009

Related U.S. Application Data

(60) Provisional application No. 61/030,375, filed on Feb. 21, 2008, provisional application No. 61/030,421, filed on Feb. 21, 2008.

(51) Int. Cl.
*B60K 5/12* (2006.01)
*B62D 21/00* (2006.01)

(52) U.S. Cl. ........ 180/299; 180/232; 180/291; 180/312; 248/638; 267/140.11

(58) Field of Classification Search ............... 180/232, 180/291, 299, 300, 312, 902, 908; 248/567, 248/638; 267/140.11, 140.13
See application file for complete search history.

(56) References Cited

U.S. PATENT DOCUMENTS

| | | | | |
|---|---|---|---|---|
| 1,729,394 A * | 9/1929 | Lee | ............................... | 248/621 |
| 1,815,170 A * | 7/1931 | Summers | ...................... | 248/621 |
| 1,829,251 A * | 10/1931 | Whittington et al. | ......... | 180/299 |
| 1,829,676 A * | 10/1931 | Royce | ............................ | 180/292 |
| 1,834,879 A * | 12/1931 | Trott | ............................... | 180/291 |
| 1,964,432 A * | 6/1934 | Geyer | ........................... | 180/291 |
| 2,988,162 A * | 6/1961 | Hansen | ........................... | 180/56 |
| 3,105,717 A * | 10/1963 | Schilberg | ..................... | 296/35.1 |
| 3,702,178 A * | 11/1972 | Schulz | ........................ | 267/140.3 |
| 3,747,879 A * | 7/1973 | Houk | ............................. | 248/609 |
| 3,841,425 A * | 10/1974 | Harkness | ...................... | 180/53.1 |
| 3,913,696 A * | 10/1975 | Kennedy et al. | ............... | 180/312 |
| 3,951,223 A * | 4/1976 | Kamlukin | ........................ | 180/11 |
| 4,240,517 A * | 12/1980 | Harlow et al. | ................ | 180/295 |
| 4,286,777 A * | 9/1981 | Brown | .......................... | 267/294 |
| 4,425,976 A | 1/1984 | Kimura | | |
| 4,648,576 A * | 3/1987 | Matsui | ..................... | 267/140.14 |
| 4,682,668 A | 7/1987 | Salmon et al. | | |
| 5,199,526 A | 4/1993 | Derviller | | |
| 5,303,896 A * | 4/1994 | Sterka | ........................... | 248/557 |
| 5,409,283 A * | 4/1995 | Ban | ................................. | 296/35.1 |
| 5,570,757 A | 11/1996 | Courtwright et al. | | |
| 6,070,689 A | 6/2000 | Tanaka et al. | | |
| 6,298,936 B1 * | 10/2001 | Yoshida | ......................... | 180/232 |
| 6,742,619 B2 * | 6/2004 | Farbotnik et al. | ............. | 180/312 |
| 7,163,200 B2 * | 1/2007 | Dickson et al. | ............ | 267/141.4 |
| 7,490,691 B2 * | 2/2009 | Reese et al. | .................... | 180/299 |
| 2009/0212185 A1 * | 8/2009 | Horgas | ........................ | 248/298.1 |

FOREIGN PATENT DOCUMENTS

JP            57026014 A  *  2/1982

* cited by examiner

*Primary Examiner* — Eric Culbreth
*Assistant Examiner* — Laura Freedman
(74) *Attorney, Agent, or Firm* — Rader, Fishman & Grauer, PLLC; James F. Kamp

(57) ABSTRACT

A vibration isolation assembly is disclosed. The vibration isolation assembly comprises a first body member, a second body member, a first isolation member, a second isolation member, and a least one fastener. The first and second body members are configured to matingly engage one another and the first and second isolation members are partially retained by portions of the first and second body members, respectively. The fastener serves to securing the first and second body members together.

14 Claims, 15 Drawing Sheets

US 8,016,067 B2

VIBRATION ISOLATION ASSEMBLY

CROSS REFERENCE TO RELATED APPLICATIONS

This application claims priority to U.S. Provisional Patent Application Nos.: 61/030,375 and 61/030,421, both filed Feb. 21, 2007, the disclosures of which are incorporated by reference in their entirety.

TECHNICAL FIELD

The disclosure generally relates to vehicle frame stiffness and flexibility, as well as isolating engine vibrations.

BACKGROUND

A vehicle frame is typically designed to flex with differing dynamic loadings. Many racing go kart frames are designed with a desired flexibility for maneuverability. This maneuverability includes understeer, oversteer, maintaining proper wheel grip, and desired deflection between frame members. However, components that are attached to the frame may undesirably affect frame flexibility. Further, the flexing of the frame during operation may impart undesirable vibration to the components that are attached to the frame.

SUMMARY

A vibration isolation assembly is disclosed. The vibration isolation assembly comprises a first body member, a second body member, a first isolation member, a second isolation member, and a least one fastener. The first and second body members are configured to matingly engage one another and the first and second isolation members are partially retained by portions of the first and second body members, respectively. The fastener serves to securing the first and second body members together.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

DETAILED DESCRIPTION

Figure 1A:
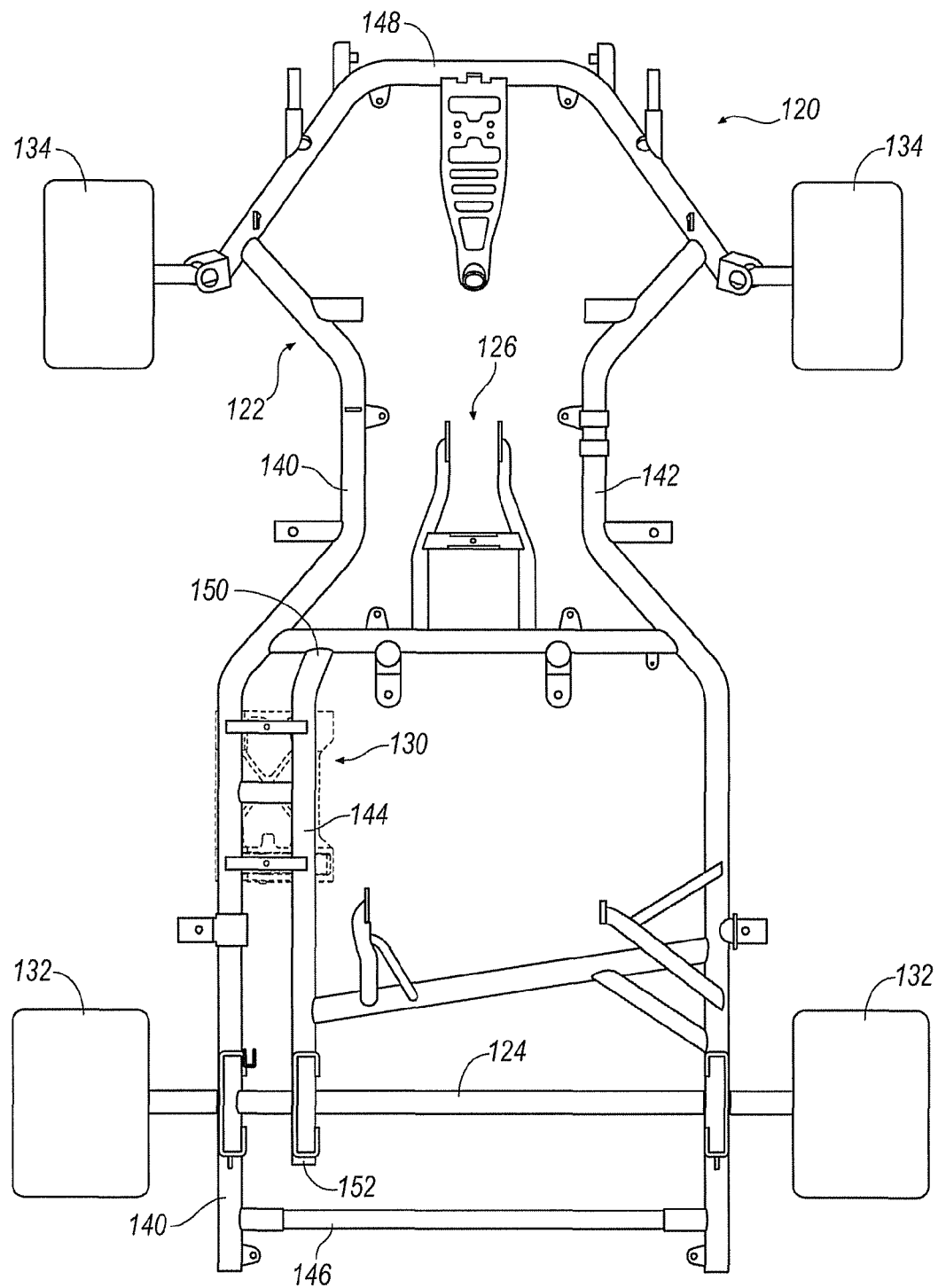
FIG. 1A is a bottom view of a vehicle frame, with a motor mount shown in phantom attached thereto.

FIG. 1A illustrates a bottom view of a vehicle assembly 120. The vehicle assembly 120 includes a frame 122, a rear axle 124, a seat area 126, a motor (not shown), a motor mount assembly 130, rear wheels 132, and front wheels 134. The motor is operably connected to the rear wheels 132 in a conventional manner.

The frame 122 includes a first frame rail 140, a second frame rail 142, a motor frame rail 144, a rear frame member 146, and a front frame rail 148. Typically, the components of frame 122 are welded for strength and desired rigidity and flexibility. The rear axle 124 is rotatably coupled to the first frame rail 140 and the second frame rail 142. In one arrangement, the first frame rail 140, the second frame rail 142, and the motor frame rail 144 are tubular members, having generally a circular cross section, although other shapes may be used. The motor frame rail 44 includes a first end 150 and a second end 152. Generally, the axes of the first frame rail 140, the second frame rail 142, and the motor frame rail 144 are positioned in a horizontal plane. A portion of the first frame rail 140 is fixedly attached to the first end 150 of the motor frame rail 144. The second end 152 of motor frame 144 is rotatably attached to the rear axle 124.

Figure 1B:
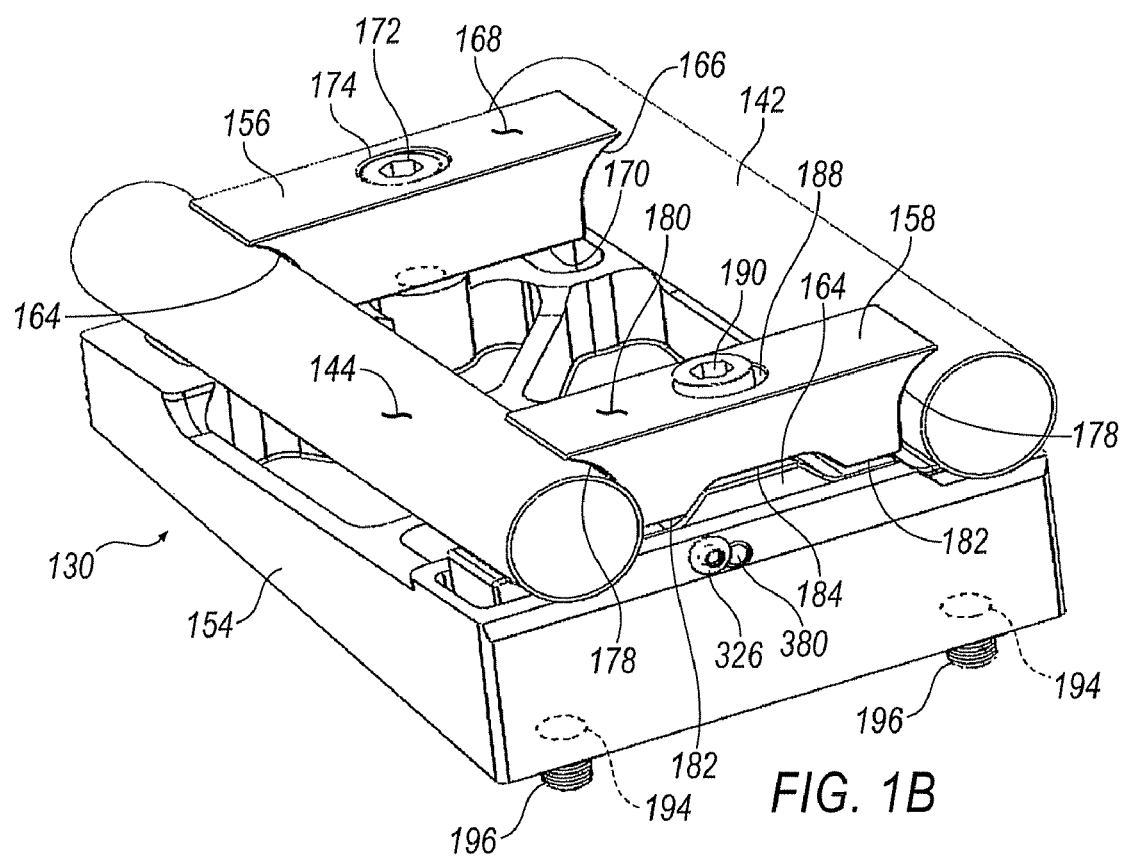
FIG. 1B is an enlarged bottom perspective view of a motor mount assembly, including the motor mount shown in FIG. 1A attached to a portion of the vehicle frame of FIG. 1A.
Figure 2:
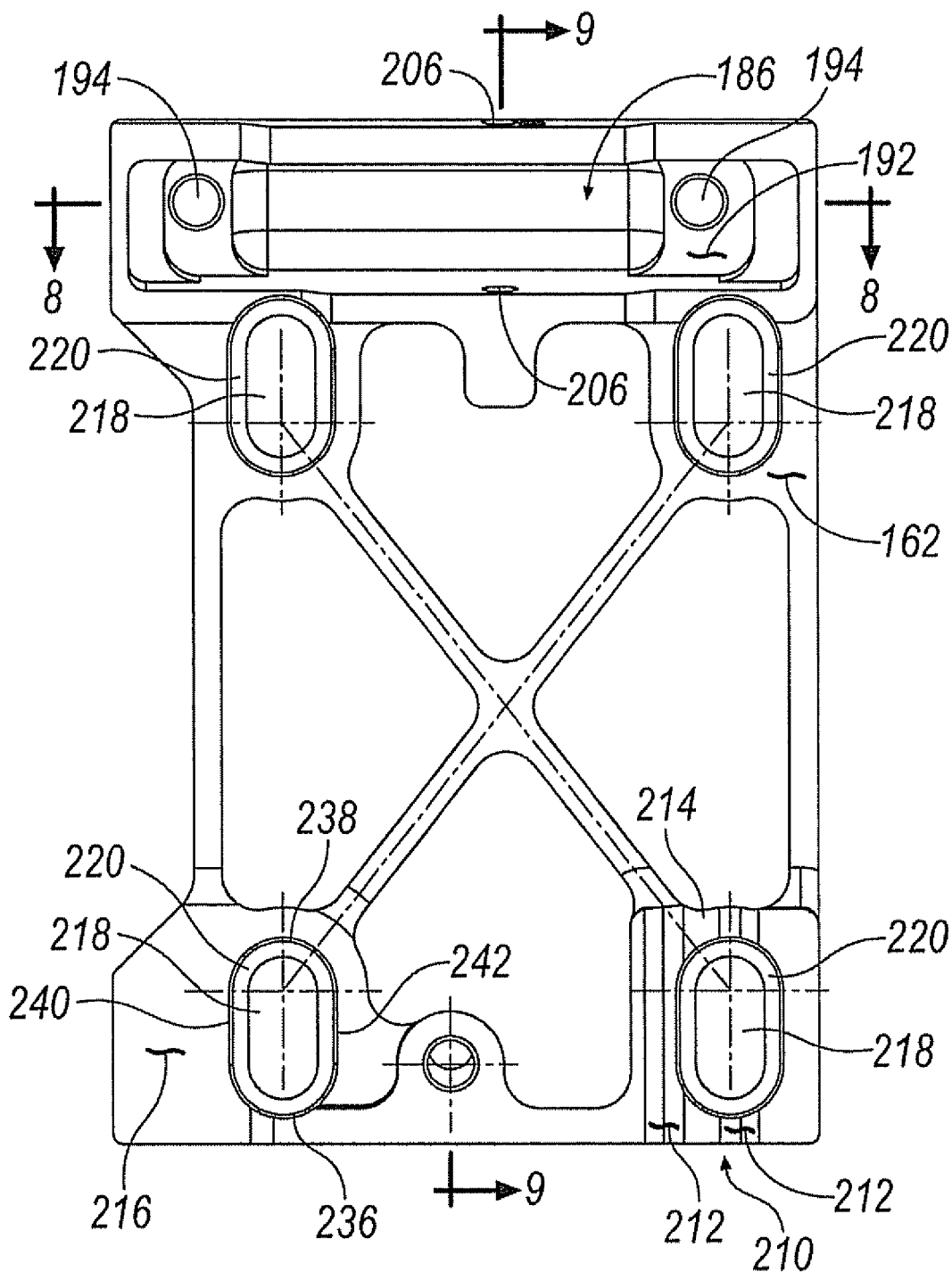
FIG. 2 is a bottom view of the motor mount of FIG. 1A.
Figure 3:
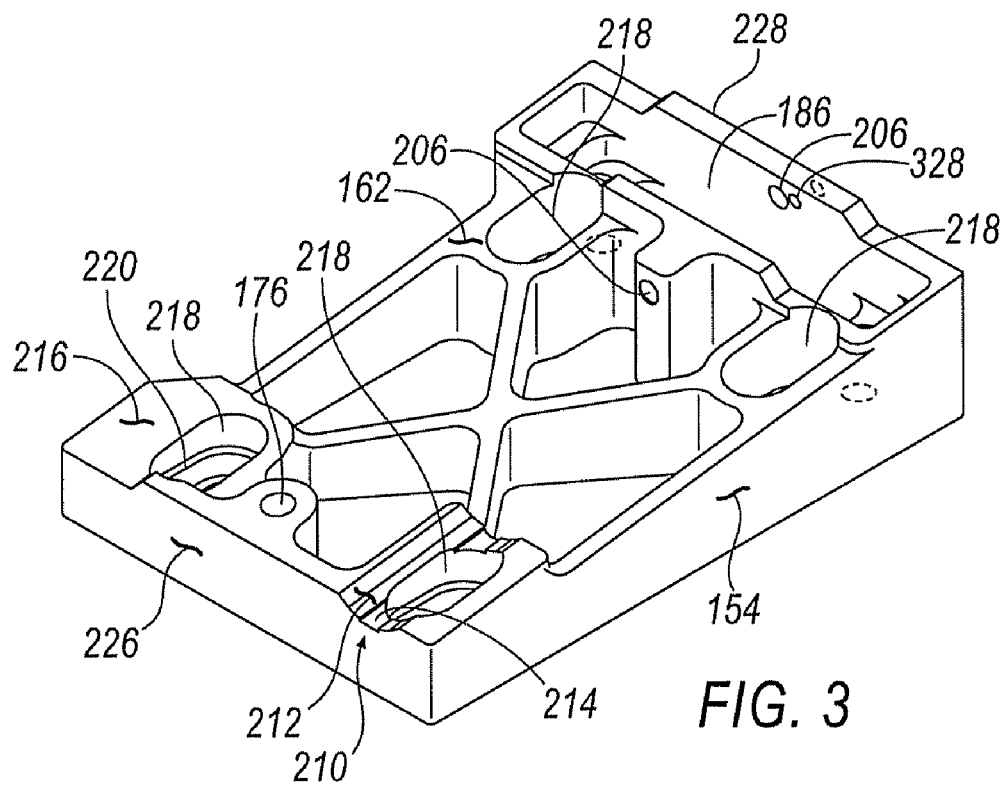
FIG. 3 is a bottom perspective view of the motor mount of FIG. 1A.

As best seen in FIG. 1B, the motor mount assembly 130 includes a mount body 154, a first clamp mechanism 156 and a second clamp mechanism 158. The mount body 154 is defined by an upper mount surface 160 (FIG. 4) and a bottom mount surface 162 (FIGS. 2 and 3). The motor mount assembly 130 further includes a saddle bracket 164. The saddle bracket 164 will be described in further detail below in connection with FIGS. 10-13.

First clamp mechanism 156 is flanked by curved end faces 166. As may be seen, when motor mount assembly 130 is secured to motor frame rail 144 and second frame rail 142, curved end faces 166 generally grip a portion of the outer surfaces of motor frame rail 144 and second frame rail 142. First clamping mechanism 156 further includes a generally planar large bottom surface 168 (oriented upside down in FIG. 1B) and a generally planar top surface 170 that contacts the bottom mount surface 162 of the mount body 154. An attachment mechanism 172 is received within an aperture 174 formed through first clamping mechanism 156. A portion of attachment mechanism 172 is also received within an aperture 176 that is formed through a portion of the bottom mount surface 162 (best seen in FIG. 3).

Figure 8:
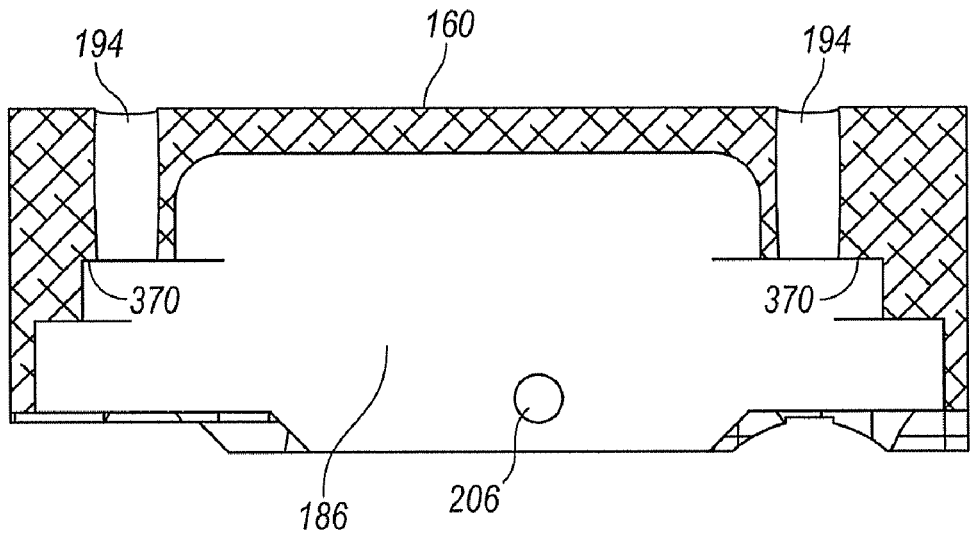
FIG. 8 is a partial sectional view taken along line 8-8 of FIG. 2.
Figure 9:
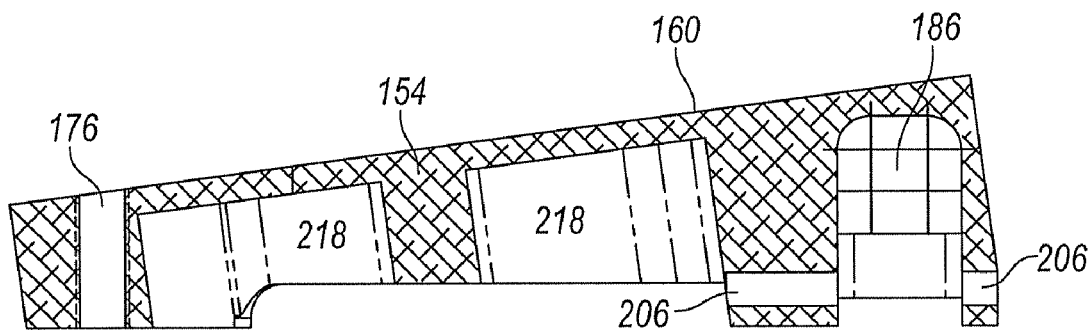
FIG. 9 is a partial sectional view taken along line 9-9 of FIG. 2.
Figure 10:
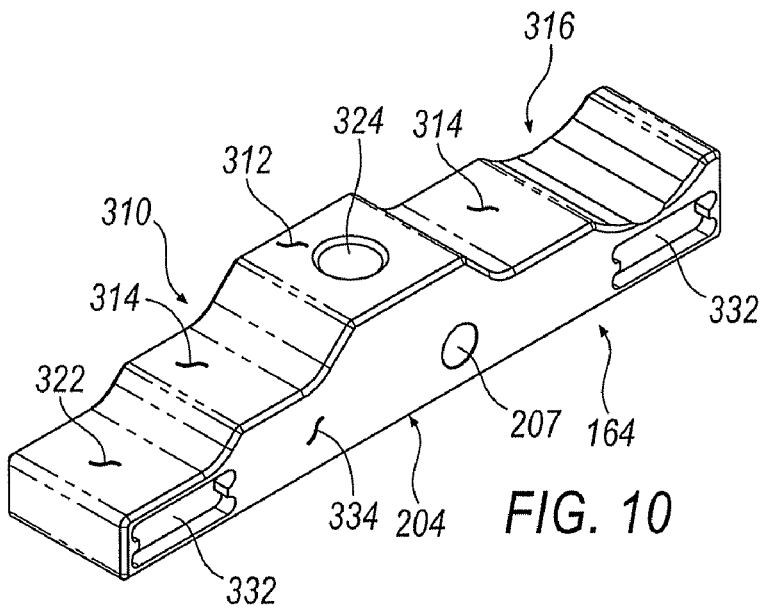
FIG. 10 is a perspective view of a saddle bracket of the motor mount assembly of FIG. 5.
Figure 16A:
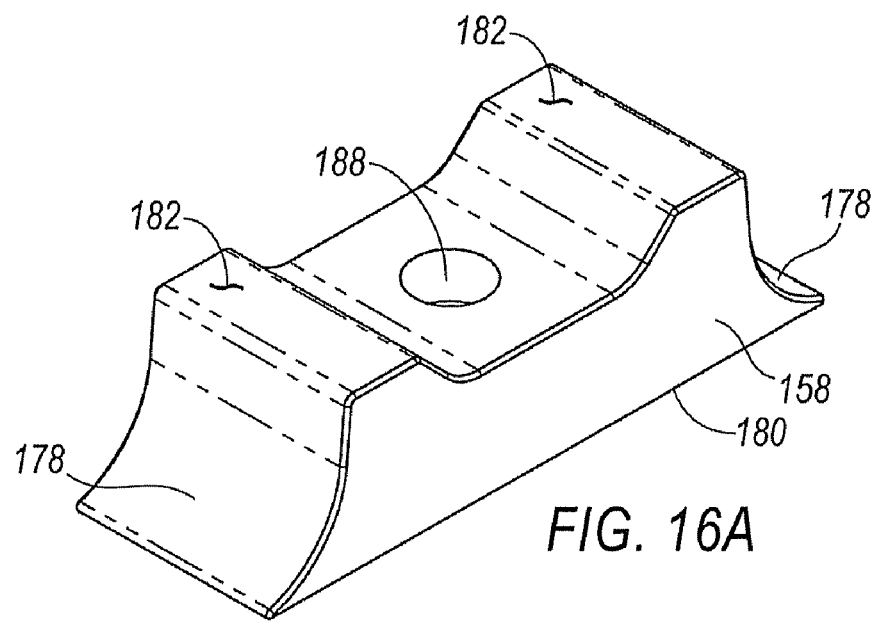
FIG. 16A is a perspective view of clamp mechanism shown in FIG. 1B.
Figure 16B:
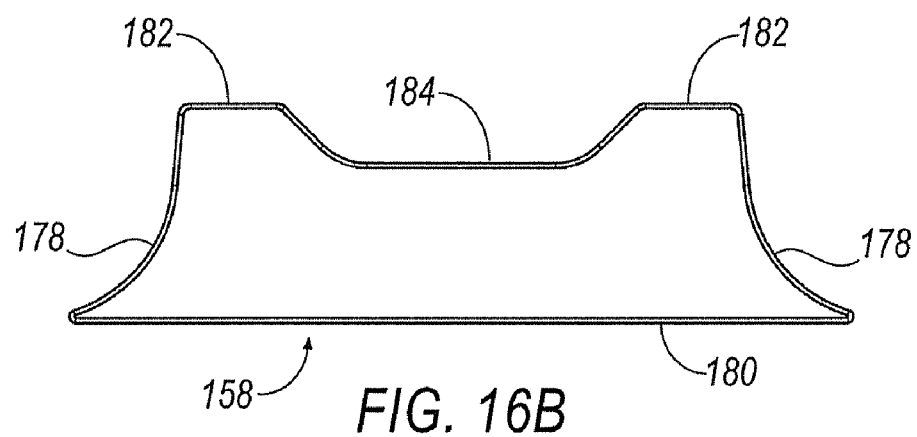
FIG. 16B is a side elevational view of the clamp mechanism of FIG. 16A.
Figure 16C:
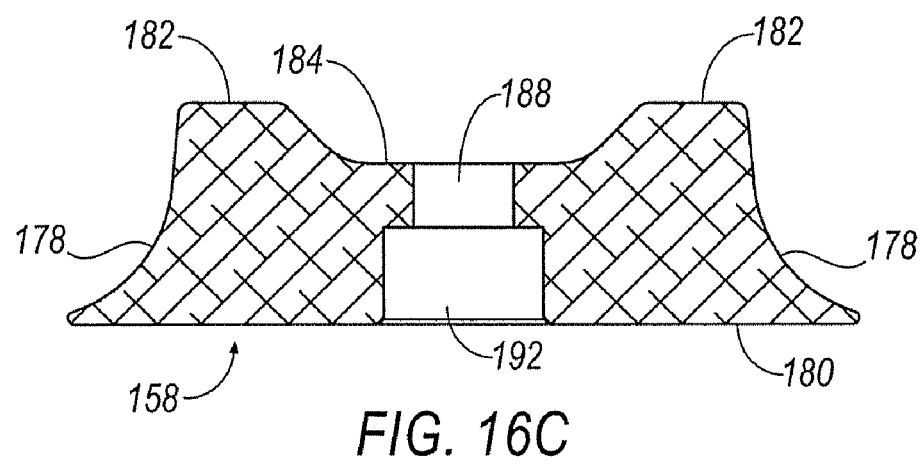
FIG. 16C is a cross-sectional view of the claim mechanism of FIG. 16A.

The second clamping mechanism 158 is mounted at an opposite end of mount body 154. Second clamping mechanism 158 is also flanked by curved end faces 178. As may be seen, when motor mount assembly 130 is secured to motor frame rail 144 and second frame rail 142, curved end faces 178 generally grip a portion of the outer surfaces of motor frame rail 144 and second frame rail 142 in a similar manner as with first clamping mechanism 156. In one arrangement, second clamping mechanism 158 further includes a generally planar bottom large bottom surface 180 (oriented upside down in FIG. 1B) and two smaller generally planar top surfaces 182 separated by notch 184. Second clamping mechanism 158 is shown in greater detail in FIGS. 16A-16C. The two top surfaces 180 of second clamping mechanism 158 contacts portions the saddle bracket 164, which is positioned within a cavity 186 formed in the bottom mount surface 162. The cavity 186 is best seen in FIGS. 3 and 8. Saddle bracket 164 will be described below in further detail. Similar to first clamping mechanism 156, an aperture 188 is formed through second clamping mechanism 156 (best seen in FIG. 16C). The aperture 188 is sized to be larger than a fastening mechanism 190 that is received therein to allow for some play when the vehicle is in operation, as will be explained below in greater detail. In one embodiment, referring specifically to FIG. 16C, aperture 188 may include a larger recessed portion 192 such that the fastening mechanism 190 may lie flush within aperture 188.

FIG. 2 illustrates the bottom mount surface 162 of motor mount body 154. At one end of motor mount body 154 is the cavity 186 that receives the saddle mount 164. Formed in the bottom surface 192 of cavity 186 is at least one adjustment aperture 194 that extends through the top mount surface 160, as best seen in FIG. 1B. In one particular arrangement, a pair of adjustment apertures 194 are horizontally spaced apart.

Figure 19:
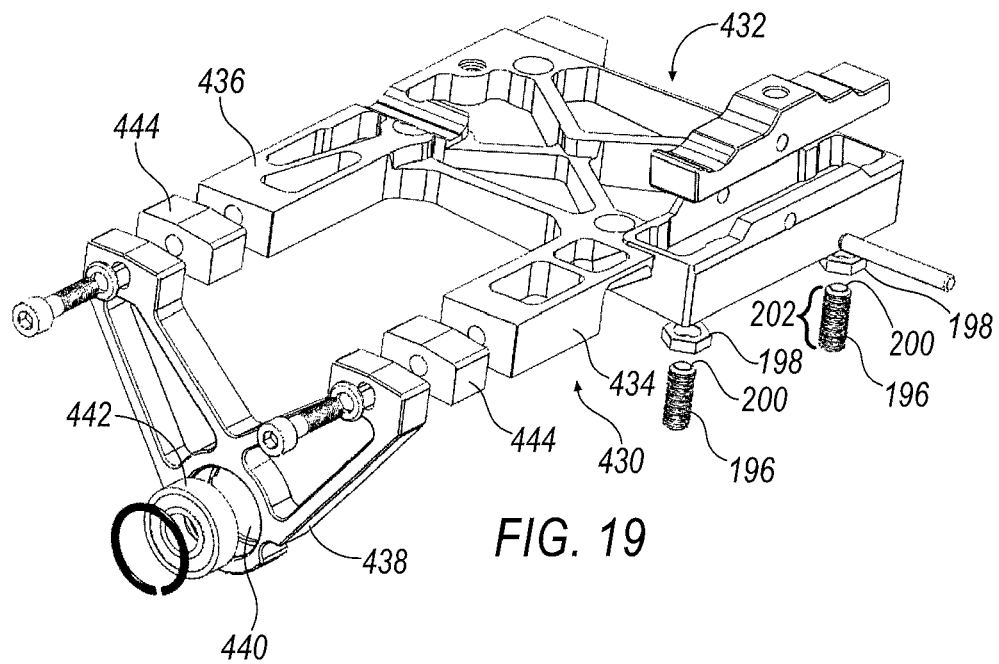
FIG. 19 is a bottom perspective view of an alternative motor mount assembly.
Figure 20:
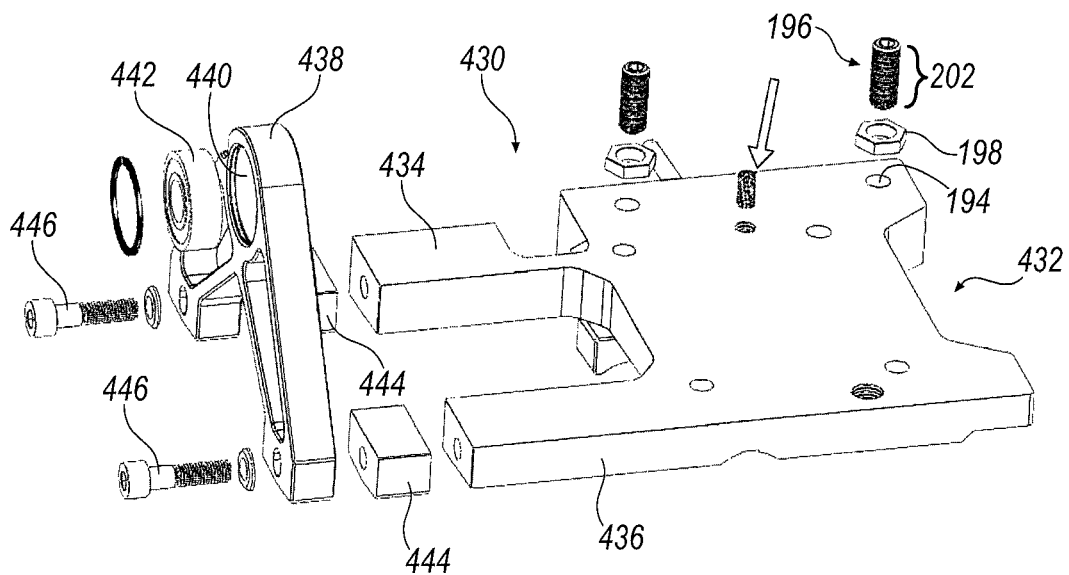
FIG. 20 is a top perspective view of the alternative motor mount assembly of FIG. 19.

Motor mount assembly 130 further includes at least one adjustment device 196 (as seen in FIGS. 1B, 19-20). In the illustrative arrangement, the adjustment device 196 is a threaded rod with an nut 198 (best see in FIG. 19). Each adjustment device 196 has a contact surface 200 and an engagement surface 202. In one arrangement, the adjustment device 196 may be rotated within one of the adjustment apertures 194 until the contact surface 200 extends through the top mount surface 160 and into cavity 186. Once extending into cavity 186, contact surface 200 will contact a generally planar surface 204 (best seen in FIG. 10) of the saddle bracket 164, selectively spacing surface 204 away from bottom surface 192.

On either side of cavity 186, cavity mounting channels 206 are formed. When saddle bracket 164 is positioned within cavity 186 (see FIG. 17, for example), a bracket mounting channel 207 is aligned with cavity mounting channels 206. Once aligned, channels 206 and 207 receive a mounting pin 208 (best seen in FIG. 5) such that saddle bracket is mounted within the cavity 186, but permitted to move about mounting pin 208.

Bottom mount surface 162 further includes a mounting groove 210 formed at an opposite end of mount body 154 from cavity 186. Mounting groove 210 comprises a hemispherical surface 212, with a channel 214 formed through a central portion thereof. Mounting groove 210 is configured to receive motor rail 144 when motor mount 130 is installed thereon. Channel 214 cooperates with surface 212 to permit slight movement of motor mount 130 along motor rail 144 during operation of the vehicle.

Laterally spaced from mounting groove 210, at the same end of mount body 154 as mounting groove 210, is a generally planar mounting surface 216. When motor mount 130 is installed on vehicle frame 120, mounting surface 216 contacts second frame rail 142.

Figure 7:
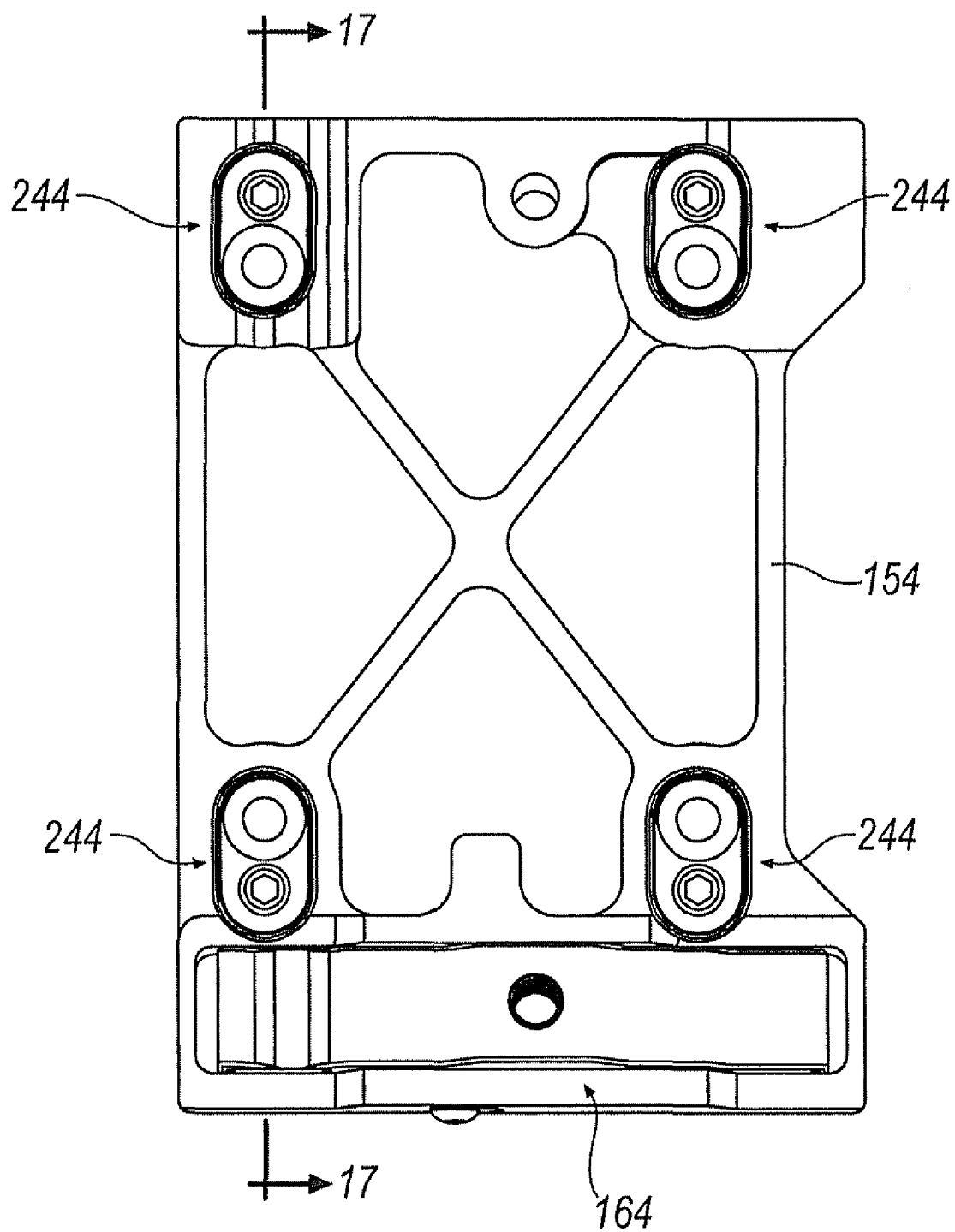
FIG. 7 is a bottom view of the motor mount assembly of FIG. 5.
Figure 21:
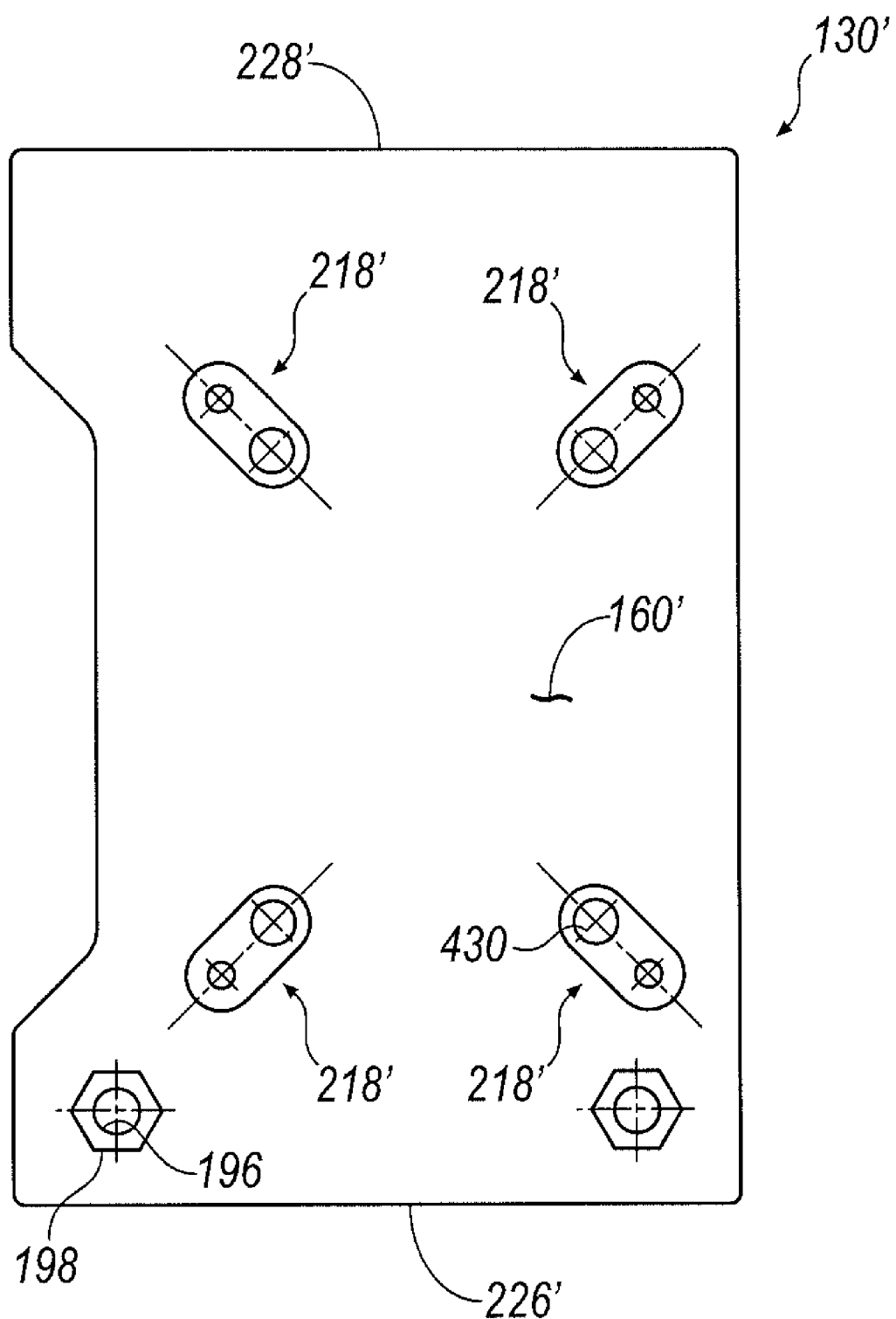
FIG. 21 is an alternative arrangement of the top face of a motor mount assembly.

Motor mount body 154 further includes one or more pockets 218 that extend through top and bottom mount surfaces 160 and 162, respectively. As may be best seen in FIG. 18B, each pocket 218 includes a stepped collar 220 that separates each pocket 218 into an upper portion 222 and a lower portion 224. While in the arrangement of the pockets 218 in the arrangement set forth in FIGS. 2 and 7 are such that a pair pockets 218 are arranged so as to generally co-linear along an axis that is generally perpendicular to the forward and rearward edges (226 and 228, respectively) of motor mount body 154, it is understood that other arrangements of pockets 218 are contemplated. For example, as shown in FIG. 21, the pockets 218' arranged adjacent the forward and rearward edges 226' and 228' are angled with respect to one another.

Referring back to FIG. 18B, the stepped collar 220 includes a generally annular ovoid first surface 230, a second surface 232, and a collar inside surface 234. As best seen in FIGS. 2 and 7, in one exemplary arrangement, each pocket 218 is an ovoid, defined by a first semi-cylindrical portion 236, a second semi-cylindrical portion 238, and a pair of opposing generally planar portions 240 and 242. It is also understood that pockets 218 may also be elliptical, oval with two axes of symmetry, rectangular, square, triangular, or any other suitable shapes.

Figure 17:
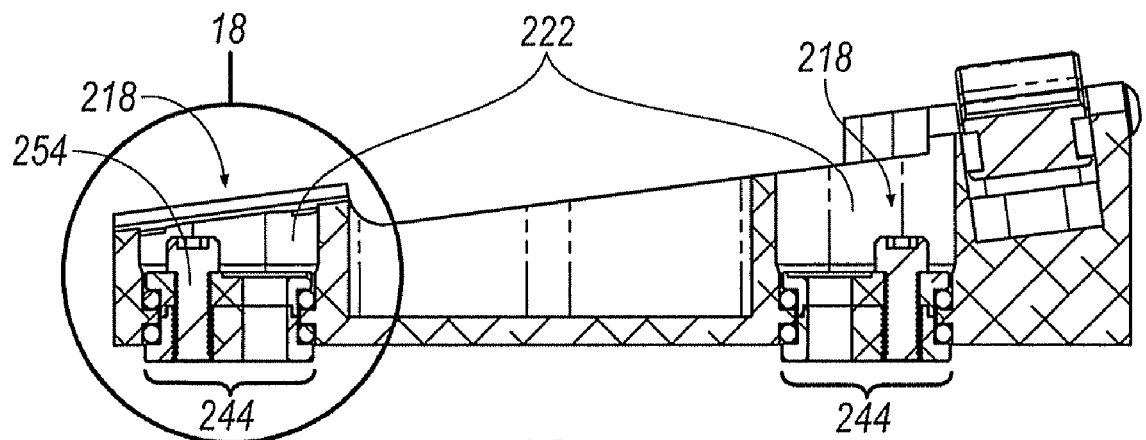
FIG. 17 is cross-sectional view of the motor mount assembly taking along lines 17-17 of FIG. 7.
Figure 18A:
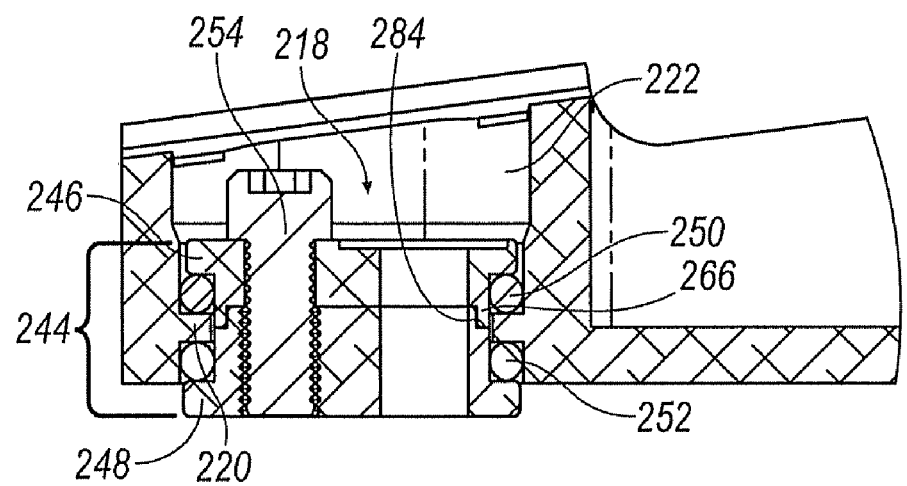
FIG. 18A is an enlarged view of encircled area 18 of FIG. 17.
Figure 18B:
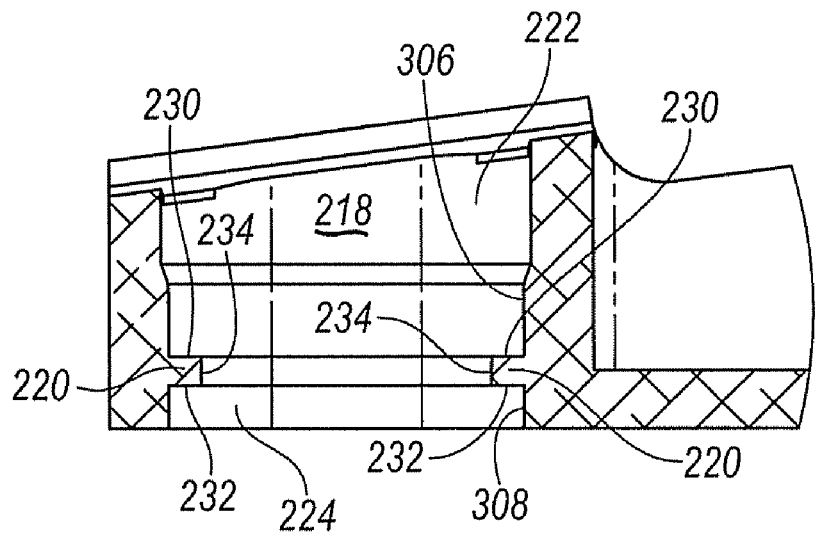
FIG. 18B is an enlarged view of encircled area 18 of FIG. 17 with a vibration isolation assembly removed for clarity.

As best seen in FIGS. 17 and 18A, a vibration isolation assembly 244 is at least partially interposed within each pocket 218. Each assembly 218 (seen also in FIG. 5 in an exploded view) includes a first member 246, a second member 248, and a first isolation member 250, and a second isolation member 252. A first fastener 254 is used to secure the first member 246 to the second member 248. A second fastener (not shown), is used to secure a motor (not shown) to the motor mount body 154, as discussed in greater detail below.

In the exemplary arrangement illustrated, each first member 246 includes a first securing aperture 256, a first mounting aperture 258, a first surface 260, a flange portion 262, a central body 264, and a tang member 266. The first mounting aperture 258 is configured to permit a portion of a second fastener (not shown) to extend therethrough. Similarly, the first securing aperture 256 is also configured to permit the first fastener 254 to extend therethrough. Both the first securing aperture 256 and the first mounting aperture 258 are formed through the first mounting member 246 from the first surface 260 to the tang member 266. The flange member 262 further includes an outer surface 268 and an upper damper mating surface 270. The central body 264 includes an outer central surface 272.

Each second member 248 includes a second securing aperture 274, a second mounting aperture 276, a second surface 278, a flange portion 280, a central body 282, and a raised edge portion 284. In one particular arrangement, the second securing aperture 274 is threaded to engage the first fastener 254. The second mounting aperture is configured to receive the second fastener.

Figure 18C:
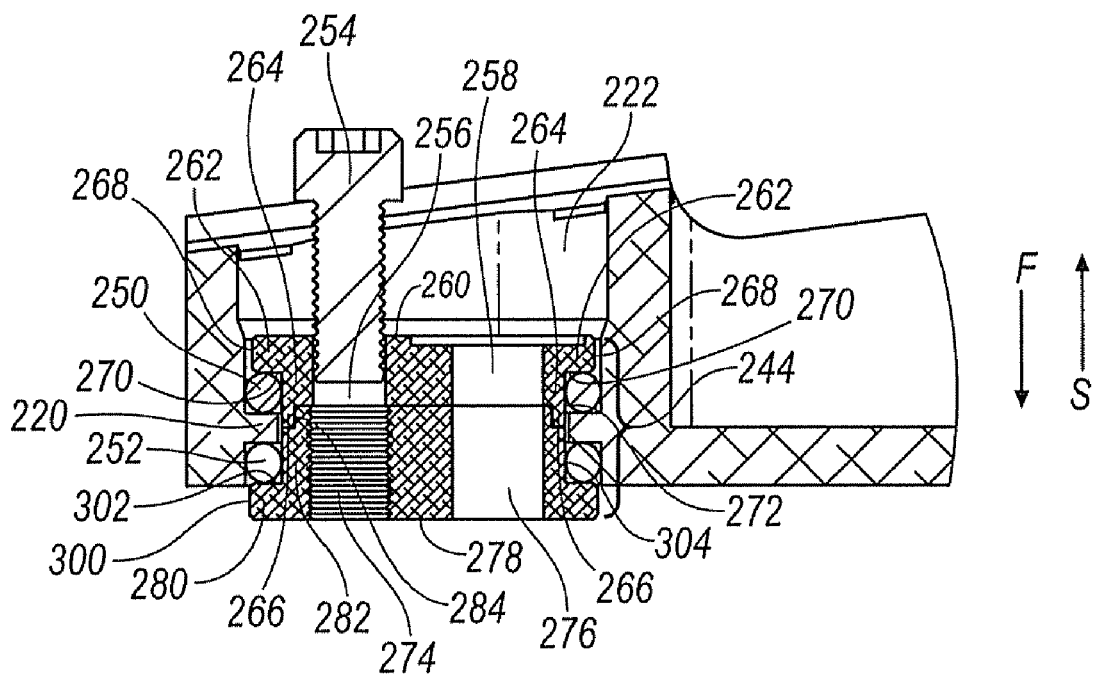
FIG. 18C is an enlarged view of encircled area 18 of FIG. 17 with a fastener partially disposed within the vibration isolation assembly.

The flange portion 280 includes an outer surface 300 and a lower damper mating surface 302. The central body 282 includes an outer central surface 304. The tang member 266 may be interposed within the raised edge portion 284 to align the first mounting member 246 with the second mounting member 248 such that the first securing aperture 256 aligns with the second securing aperture 274, and the first mounting aperture 258 aligns with the second mounting aperture 276, as illustrated in FIGS. 17, 18A and 18C.

Figure 4:
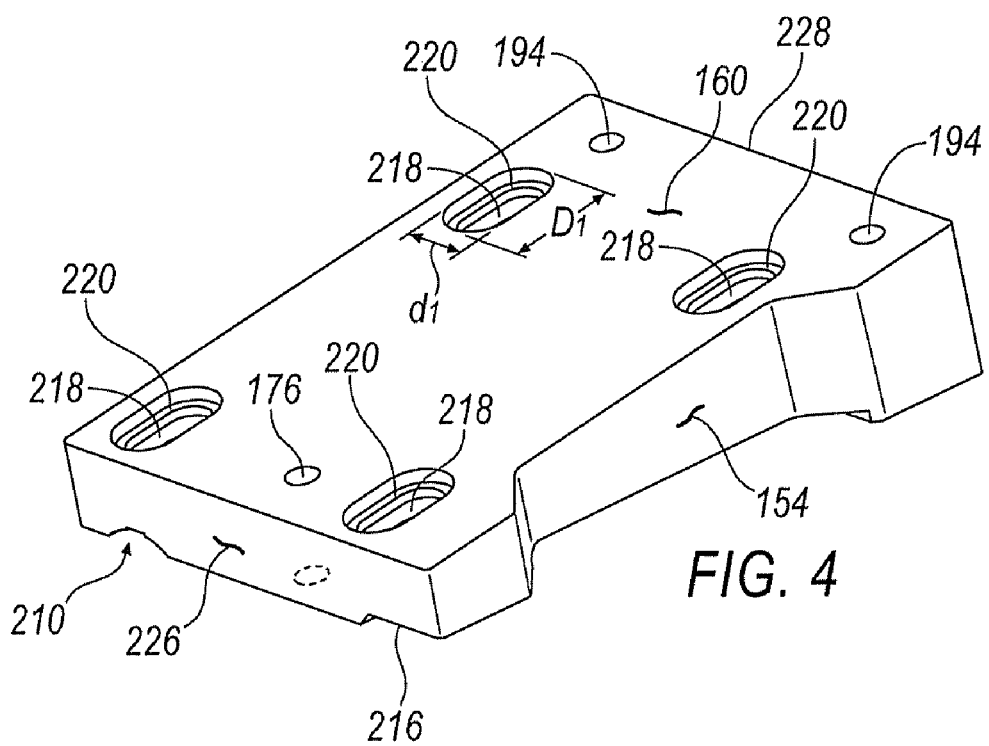
FIG. 4 is a top perspective view of the motor mount of FIG. 1A.
Figure 5:
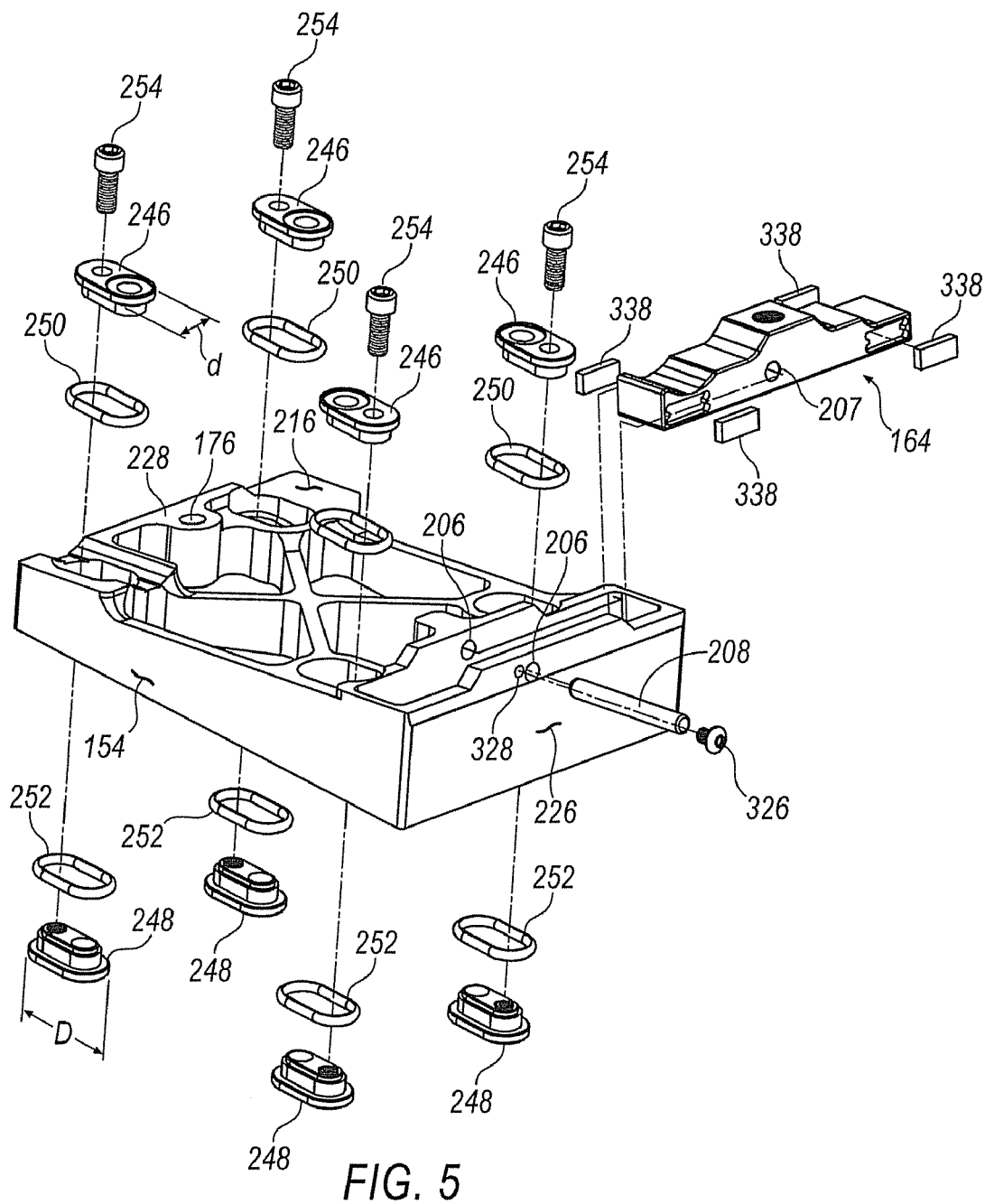
FIG. 5 is an exploded view of a motor mount assembly, including the motor mount of FIG. 1A.

As seen in FIG. 5, each first mounting member 246 and second mounting member 248 generally define a major diameter D and a minor diameter d. Similarly, each motor mounting aperture 218 includes a complementary major diameter $D_1$ and minor diameter $d_1$ (FIG. 4). In the embodiment illustrated, the major diameter D is larger than the minor diameter d and each first mounting member 246 and second mounting member 248 are generally symmetrical about both the major diameter D and the minor diameter d such that the vibration isolation assembly 244 may be rotated about 180 degrees as viewed in FIG. 6B. Accordingly, each first and second mounting apertures 258 and 276 of the vibration isolation assembly 244 may be repositioned relative to the motor mount body 154 such that motors with differing distances between locations for receiving a second fastener may be accommodated. That is, the vibration isolation assembly 244 may be repositioned relative to the motor mount body 154 to provide an adjustable bolt pattern for differing motors.

Referring back to 17-18C, the first isolation member 250 is positioned around the outer central surface 264 and abutting upper damper mating surface 270, such that when the first isolation member 250 is properly seated within pocket 212, first isolation member 250 also contacts first surface 230 (best seen in FIG. 18B) and an inner wall member 306 of upper portion 222. The second isolation member 252 is positioned around the outer central surface 304 and abutting lower damper mating surface 302, such that when the second isolation member 252 is properly seated within pocket 212, the second isolation member 252 also contacts second surface 232 and an inner wall member 308 of lower portion 224. In the illustrative embodiment, the first and second isolation members 250, 252 are configured as O-rings, although other isolation members may be used.

To install vibration isolation assembly 244 on the motor mount body 154, the first isolation member 250 is positioned around the outer central surface 272 of the first mounting member 246 and the first mounting member 246 is interposed within the pocket 218 from the bottom mount surface 162 side. The second isolation member 252 is positioned around the outer central surface 304 of the second mounting member 248 and the second mounting member 248 is at least partially interposed within the pocket 218 from the top side (upper mount surface 160). The first fastener 254 is interposed within the first securing aperture 256 and threaded with the second securing aperture 274 until the tang member 266 engages the raised edge portion 284 (as seen in FIGS. 18A and 18C). As the first fastener 254 is tightened, the first isolation member 250 and the second isolation member 252 are brought into a slight compression that promotes vibration damping between the vibration isolation assembly 244 and the motor mount body 154.

In the illustrative embodiment, the first mounting member 246 may be configured so as to be insertable into the pocket 218 in only a first direction F while the second mounting member 248 is configured to be insertable into the pocket 218 in only a second direction S, with the first direction F being generally opposite the second direction S. For example, the flange portions 262 and 280 maybe be configured to as to only be received with certain sides the motor mount body 154.

When a vibration isolation assembly 244 has been installed within each pocket 218 of the motor mount body 154, the motor may be secured to the motor mount body 154 by placing a motor on the surfaces 278 of the vibration isolation assembly 244 and interposing a second fastener through aligned first and second mounting apertures 258 and 276 and into engagement with a fastening portion of the motor.

Figure 6A:
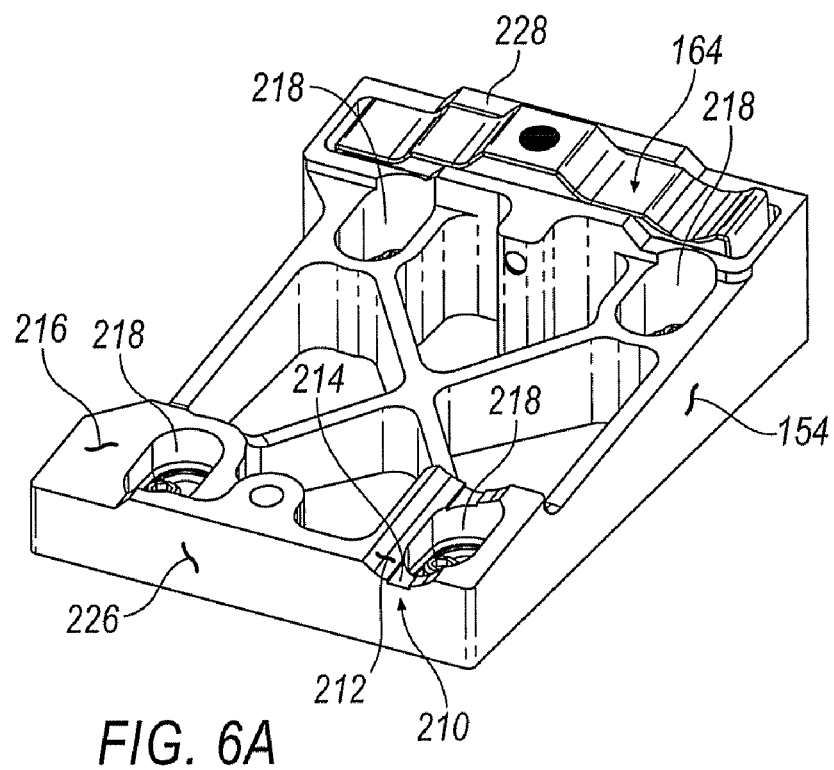
FIG. 6A is a bottom perspective view of the motor mount assembly of FIG. 5.
Figure 6B:
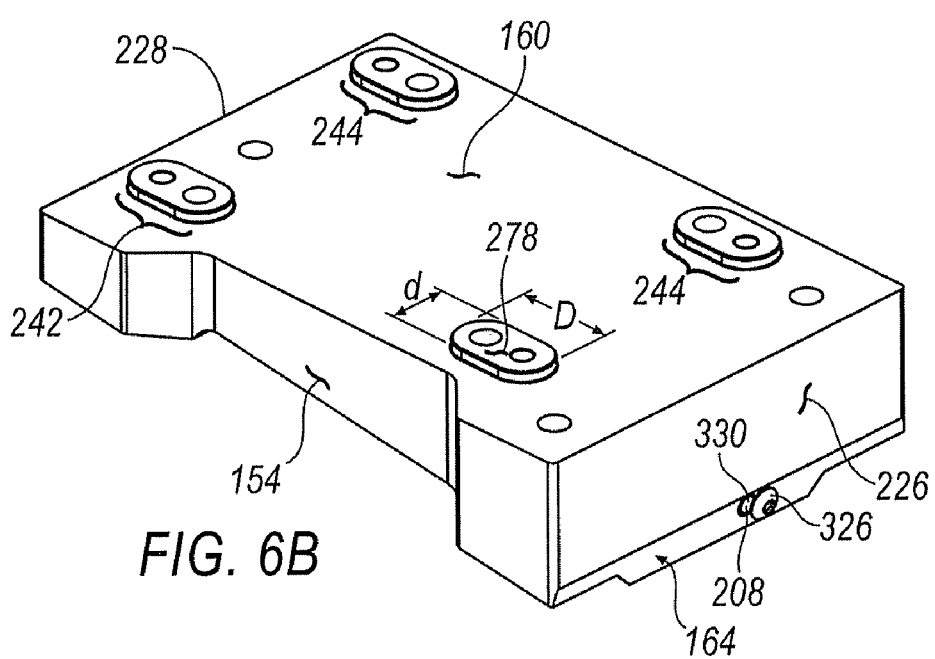
FIG. 6B is a top perspective view of the motor mount assembly of FIG. 5.

As best illustrated in FIG. 6B, the surface 278 of each vibration isolation assembly 244 extends beyond the upper mount surface 160 of the motor mount body 154 such that the motor may not contact the upper mount surface 160 when installed on the surfaces 278.

Figure 11:
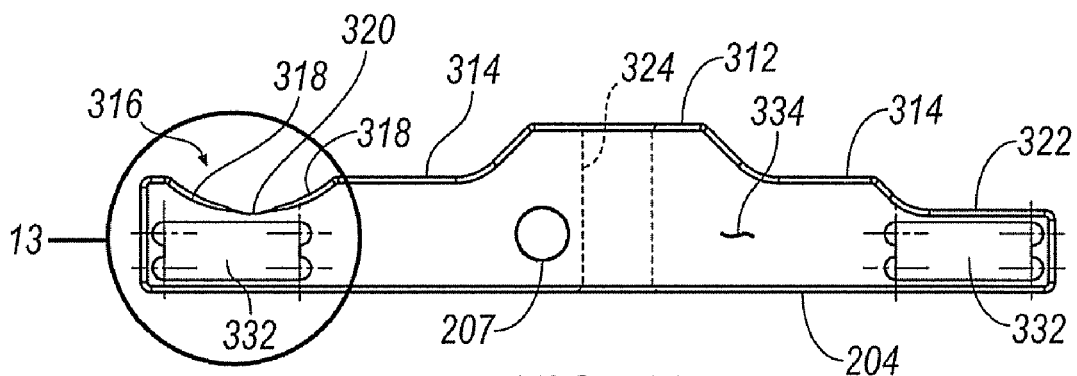
FIG. 11 is a side elevational view of the saddle bracket of FIG. 10.
Figure 12:
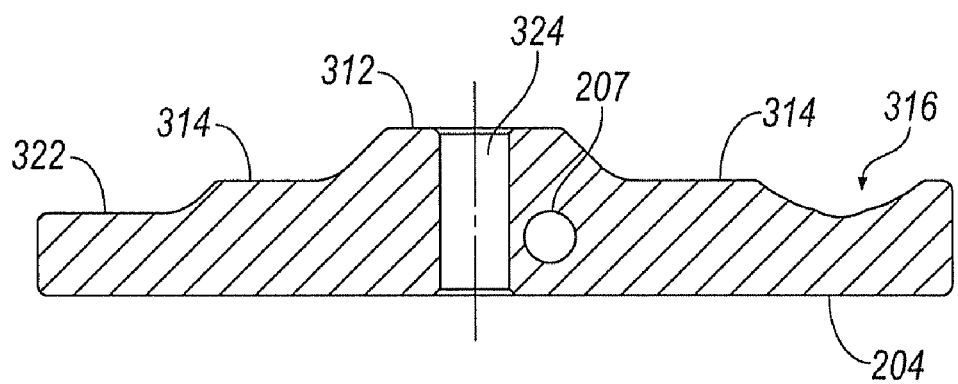
FIG. 12 is a cross-sectional view of the saddle bracket of FIG. 10, taken through the longitudinal center of the saddle bracket.
Figure 13:
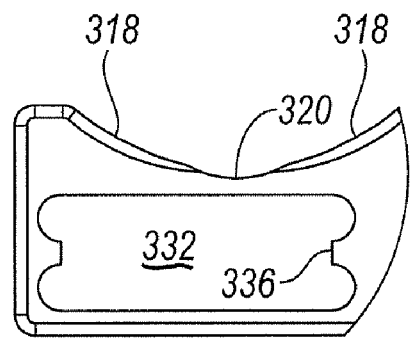
FIG. 13 is an enlarged view of encircled area 13 of FIG. 11.

Referring now to FIGS. 10-13, the saddle bracket 164 will be described. Saddle bracket 164 is generally defined by the generally planar first surface 204 and a contoured second surface 310. Second surface 310 includes a generally planar mounting surface 312 that is flanked intermediate surfaces 314. On one side of intermediate surface there is formed a mounting groove 316. Mounting groove 316 generally corresponds to mounting groove 210 formed on motor mounting body 154. As best seen in FIGS. 11-13. Mounting groove 316 comprises a hemispherical surface 318, interrupted by a channel 214 formed through a central portion thereof. Opposite the mounting groove 316 is a generally planar mounting surface 322.

Mounting surface 312 is provided with an attachment aperture 324. Attachment aperture 324 extends vertically at least partially through the saddle bracket 164 and receives fastening mechanism 190 when second clamping mechanism 158 is secured to saddle bracket 164 (as shown in FIG. 1B). In one exemplary arrangement, attachment aperture 324 is threaded.

Extending through horizontally through saddle bracket 164 is the bracket mounting channel 207. As may be seen, bracket mounting channel 207 is offset such that bracket mounting channel 207 does not intersect with attachment aperture 324. Bracket mounting channel 207 aligns with cavity mounting channel 206 to receive mounting pin 208 (as seen in FIG. 5). Once positioned, mounting pin 208 permits saddle bracket 164 to pivot about mounting pin 208, while in cavity 186. In one exemplary embodiment, a rivet member 326 (best seen in FIGS. 1B and 5 is received within secondary aperture 328 (see FIG. 3) formed adjacent to cavity mounting channel 206 after mounting pin 208 is received with the aligned channels 206 and 207. Due to its size, rivet member 326 extends over a portion of an end face 330 of mounting pin 208 so as to positively retain mounting pin 208 within motor mount body 154.

In one exemplary embodiment, at either end of saddle bracket are disposed pocket members 332. More specifically, pocket members 332 are formed in both faces 334 of saddle bracket 164, and each extend a predetermined distance into each face 334. The pocket members 332 each are formed with gripping extensions 336 that extends inwardly from a periphery of the pocket member 332. As best seen in FIG. 5, each pocket member 332 receives rub pads 338. In one exemplary embodiment, the rub pads 338 are constructed of nylon. The rub pads 338 permit the saddle bracket 164 to glide on the inside of the cavity 186 with little friction.

Figure 14:
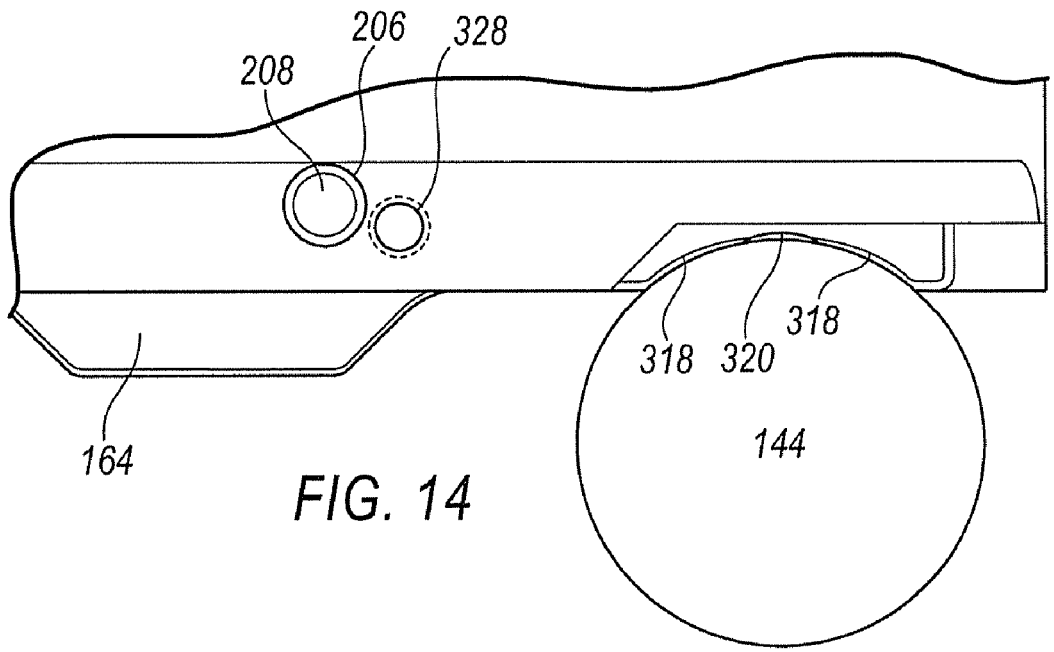
FIG. 14 is an enlarged rear end view of the motor mount assembly of FIG. 5.
Figure 15:
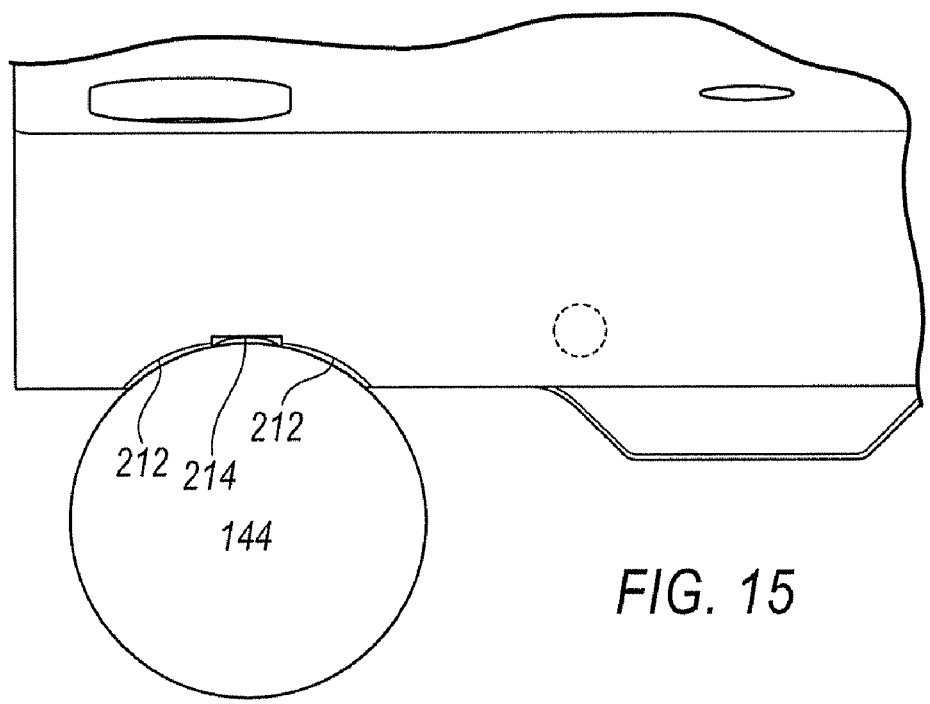
FIG. 15 is an enlarged front end view of the motor mount assembly of FIG. 5.

Referring back to FIG. 1B, when saddle bracket 164 is positioned within cavity 186 and secured to motor mount body 154 via mounting pin 208; as described above, second clamping mechanism 158 is connected to saddle bracket 164 via fastener 190. The motor rail frame 144 is partially retained by the mounting groove 316 in saddle bracket 164, the corresponding mounting groove 210 formed in bottom mount surface 162, and curved end faces 164 and 178. Referring to FIGS. 14-15, as shown, the motor frame rail 144 is partially retained by the mounting grooves 210, 316. The channels 214 and 320 of the mounting grooves 210, 316 serve to provide two points of contact for the motor rail frame 144, thereby increasing the contact area to secure the motor mount assembly 130 to the frame 122. The second frame rail 142 is partially retained by the generally planar mounting surface 322 of the saddle bracket 164, the generally planar mounting surface 216 of the bottom mount surface 162 and the curved end faces 164 and 178 of the first and second clamping members 156 and 158.

As described above in connection with FIGS. 2-3, the saddle bracket 164 is mounted within the cavity 186 such that the generally planar surface 204 is oriented to face the interior of cavity 186. As also mentioned above, the motor mount body 154 includes at least one adjustment aperture 194 that extends through the top mount surface 160 and into cavity 186. An adjustment device 196 is inserted into the adjustment aperture 194 and selectively advanced into the cavity 186 and into contact with the generally planar surface 204 of saddle bracket 164.

Because the saddle bracket 164 is mounted for pivotal movement about mounting pin 208, adjustment devices 196 may be used to selectively limit or increase the degree of pivot of saddle bracket 164. That is, the saddle bracket 164 will rotate relative to the motor mount body 154 as limited by the adjustment devices 196 contact (or non-contact) with the surface 204 of the saddle bracket 164. The pivot action allows the second frame rail 142 and the motor frame rail 144 to move generally independently of each other, as will be discussed in greater detail below.

Additionally, one or more dampener portions, such as a spring (not shown), may be positioned within cavity 186 at a flange surface 370 (see FIG. 8) so as to be interposed between the flange surface and generally planar surface 204 of saddle bracket 164 to damp the degree of pivot between the motor mount body 154 and the saddle bracket 164. This dampener portion(s) may help prevent unwanted movement of the motor mount body 154 relative to the frame 122, and may help control the desirable flexibility/stiffness of the frame 122.

The fastening mechanism 190 is secured in the aperture 188 of the second clamping mechanism 158 to clamp the second frame rail 142 between the generally planar mounting surfaces 322, 216 of the saddle bracket 164 and motor mount body 154, respectively, and the curved end faces 166, 178 of the first and second clamping mechanisms 156, 158. The fastening mechanism 190 also serves to clamp the motor frame rail 144 between the mounting grooves 316, 210 of the saddle bracket 164 and motor mount body 154, respectively, and the curved end faces 166, 178 of the first and second clamping mechanisms 156, 158. Once coupled, the portion of the motor mount body 154 adjacent the second clamping mechanism 158 is permitted to pivot (when viewed in the viewing direction of FIG. 1A) relative to the second clamping mechanism 158 (and the second frame rail 140 and the motor frame rail 144), while the first clamping mechanism 156 will not significantly pivot relative to the second frame rail 140 and the motor frame rail 144.

Operation of the vehicle may result in the frame 122 flexing sufficiently so as to distort the motor frame rail 144 relative to the second frame rail 140. This distortion includes movement of at least a portion of the first frame rail 142 and the motor frame rail 144 relative to the second frame rail 140, including horizontal displacements. That is, for example, the motor frame rail 144 will be in a different horizontal plane than the second frame rail 140. As best seen in FIG. 1A, the horizontal displacement between the second frame rail 140 and the motor frame rail 144 adjacent the frame end 150 is minimal since the first end 150 is coupled to a cross member. However, the horizontal displacement at the location of a second clamping mechanism 158 may be greater during operation of the vehicle as the frame 122 flexes due to external loadings.

In the exemplary embodiment illustrated, the horizontal displacement between the second frame rail 142 and the motor frame rail 144 is about zero when the vehicle is not in operation, although some horizontal displacement may be permitted. During operation of the vehicle, the motor frame rail 144, at the location of coupling to the second clamping mechanism 158, will flex upward and flex downward relative to the second frame rail 140. The pivot action permitted by the pin member 208 will permit this flexing to occur with minimal resistance provided by the second clamping mechanism 158. In contrast, if the second clamping mechanism 158 did not incorporate any pivot action, the stiffness of the motor mount body 154 may resist the flexing of the motor frame rail 144 and the second frame rail 142. This resistance to flexibility may be undesired where the frame 122 was designed and constructed with a desired flexibility.

FIGS. 19-20 illustrate an alternative embodiment of the motor mount assembly 130 as a motor mount assembly 430. The motor mount assembly 430 incorporates a motor mount body 432 with a first extension 434 and a second extension 436 with a bearing support 438 attached thereto. The bearing support 438 includes a bearing aperture 440 formed therein for supporting a bearing 442 that supports a shaft for the motor. Optional spacers 444 may also be provided to accommodate different sized clutches. In one embodiment, the first and second extensions 434, 436 are integrally formed with the motor mount body 432. The bearing support 438 may be fixedly secured to the first and second extensions 434, 436 via fasteners 446.

In the illustrative example, the motor mount body 154, 432 is constructed of aluminum although other materials may be used.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A vibration isolation assembly, comprising:
a first body member, wherein the first body member includes at least one first mounting aperture and wherein the first body member is defined by a generally planar end face, and wherein the end face further comprises a recess formed around the first mounting aperture; wherein the recess has a diameter that is greater than a diameter of the first mounting aperture;
a second body member, wherein the second body member includes at least one second mounting aperture;
a first isolation member;
a second isolation member; and
at least one fastener for securing the first and second body members together;
wherein the first and second body members are configured to matingly engage one another such that the first and second mounting apertures are aligned; the aligned first and second mounting apertures configured to each receive the fastener to secure a motor to the vibration isolation assembly and the first and second isolation members are partially retained by portions of the first and second body members, respectively.

2. The vibration isolation assembly of claim 1, wherein the first body member further comprises a flange portion, a tang portion and a body portion disposed between the flange portion and the tang portion.

3. The vibration isolation assembly of claim 2, wherein the tang portion is formed on an outer edge of the first body member and has an end face that extends outwardly from an end face of the body portion.

4. The vibration isolation assembly of claim 2, wherein the flange portion extends outwardly from an outer edge of the first body member and wherein the first isolation member is partially retained by the flange portion.

5. The vibration isolation assembly of claim 1, wherein the second body member further comprises a flange portion, a raised edge portion, and a body portion disposed between the flange portion and the raised edge portion.

6. The vibration isolation assembly of claim 5, wherein the raised edge portion is spaced inwardly from an outer edge of the second body member.

7. The vibration isolation assembly of claim 5, wherein the flange portion extends outwardly from an outer edge of the second body member and wherein the second isolation member is partially retained by the flange portion.

8. The vibration isolation assembly of claim 1, wherein at least the second retaining aperture is threaded and the fastener is threaded.

9. A combination of a motor mount body and at least one vibration isolation assembly that is connected to the motor mount body, the combination comprising:
the motor mount body, wherein the motor mount body is defined by a bottom surface and a top surface and comprises;
at least one pocket member formed within the motor mount body, wherein the pocket member extends between the bottom and top surfaces and further comprises a stepped collar extending inwardly from an inner periphery of the pocket, wherein the stepped collar serves to separate the pocket into a first portion and a second portion;
the vibration isolation assembly configured to be at least partially received within the pocket member, wherein the vibration isolation assembly further comprises:
a first body member;
a second body member;
a first isolation member;
a second isolation member; and
at least one fastener for securing the first and second body members together;
wherein the first and second body members are configured to matingly engage one another and the first and second isolation members are partially retained by portions of the first and second body members, respectively.

10. The motor mount body and vibration isolation assembly of claim 9, wherein:
the first body member and the first isolation member are received within the first portion of the pocket such that the first isolation member is positioned on a first side of the stepped collar; and
the second body member and the second isolation member are received within the second portion of the pocket such that second isolation member is positioned on a second side of the stepped collar.

11. The motor mount body and vibration isolation assembly of claim 10, wherein the second portion of the pocket has a depth that is less than a height of the second body member such that when the vibration isolation assembly is positioned within the pocket member, a portion of the second body member extends outwardly from the top surface of the motor mount.

12. The motor mount body and vibration isolation assembly of claim 9, further comprising a plurality of pocket members formed in the motor mount body, each pocket member receiving a vibration isolation assembly, wherein at least one pair of the pocket members are arranged along a common axis that extends across a length of the motor mount body.

13. The motor mount body and vibration isolation assembly of claim 12, wherein the vibration isolation assembly may be inserted into each pocket member in one of two orientations, whereby a first orientation is 180° from a second orientation.

14. The motor mount body and vibration assembly of claim 9, further comprising a plurality of pocket members formed in the motor mount body, each pocket member receiving a vibration isolation assembly, wherein at least one pair of the pocket members are arranged to be angled with respect to one another.

* * * * *